US011065568B2

(12) United States Patent
Kariveti et al.

(10) Patent No.: US 11,065,568 B2
(45) Date of Patent: Jul. 20, 2021

(54) SMART FILTER MODULE ANALYSIS SYSTEM AND ASSOCIATED METHODS

(71) Applicant: Mann+Hummel GMBH, Ludwigsburg (DE)

(72) Inventors: Sreenath Kariveti, Raleigh, NC (US); Charles Vaillant, Holly Springs, NC (US)

(73) Assignee: MANN+HUMMEL GmbH, Ludwigsburg (DE)

( * ) Notice: Subject to any disclaimer, the term of this patent is extended or adjusted under 35 U.S.C. 154(b) by 109 days.

(21) Appl. No.: 15/875,100

(22) Filed: Jan. 19, 2018

(65) Prior Publication Data
US 2019/0224596 A1   Jul. 25, 2019

(51) Int. Cl.
*B01D 35/143* (2006.01)
*B01D 61/18* (2006.01)
*B01D 61/22* (2006.01)
*B01D 61/12* (2006.01)
*B01D 61/08* (2006.01)

(52) U.S. Cl.
CPC ......... *B01D 35/1435* (2013.01); *B01D 61/08* (2013.01); *B01D 61/12* (2013.01); *B01D 61/18* (2013.01); *B01D 61/22* (2013.01); *B01D 2311/06* (2013.01); *B01D 2311/08* (2013.01); *B01D 2313/90* (2013.01)

(58) Field of Classification Search
CPC .... B01D 35/1435; B01D 61/08; B01D 61/12; B01D 61/18; B01D 61/22; B01D 65/10; B01D 2311/06; B01D 2311/08; B01D 2311/24; B01D 2313/90
See application file for complete search history.

(56) References Cited

U.S. PATENT DOCUMENTS

| 5,353,630 | A  | * | 10/1994 | Soda ................... B01D 65/102 73/38 |
| 5,779,911 | A  |   | 7/1998  | Haug |
| 6,332,110 | B1 |   | 12/2001 | Wolfe |
| 6,334,959 | B1 | * | 1/2002  | Sutton ................. B01D 35/143 210/767 |
| 2003/0150807 | A1 | | 8/2003 | Bartels et al. |
| 2011/0100907 | A1 | | 5/2011 | Zha et al. |
| 2011/0211976 | A1 | | 9/2011 | Magoon et al. |
| 2012/0074060 | A1 | | 3/2012 | Lass |

(Continued)

FOREIGN PATENT DOCUMENTS

| EP | 1944077 A1 | 7/2008 |
| EP | 2540674 A1 | 1/2013 |

(Continued)

*Primary Examiner* — M. N. Von Buhr

(57) ABSTRACT

A filter module analysis system configured for the analysis of a filter module having a filter element contained within a housing, the housing having an inlet, a clean outlet and a waste outlet. A clean outlet sensor assembly can be provided about the clean outlet, and a waste outlet sensor assembly can be provided about the waste outlet. A data collection and network communication mechanism can be configured to receive process and receive data from the clean and waste outlet sensor assemblies and transmit the data over a network to a server form storage and processing filter module statuses based on flow detected flow parameters.

13 Claims, 10 Drawing Sheets

(56) References Cited

U.S. PATENT DOCUMENTS

| | | | |
|---|---|---|---|
| 2012/0074069 A1* | 3/2012 | Ripley | B01D 35/1435 |
| | | | 210/741 |
| 2016/0331887 A1 | 11/2016 | Masuda | |
| 2018/0117508 A1* | 5/2018 | Paluszewski | B01D 35/143 |
| 2018/0144559 A1* | 5/2018 | Hukill | G07C 5/008 |
| 2019/0041079 A1* | 2/2019 | Kohn | B01D 35/143 |

FOREIGN PATENT DOCUMENTS

| | | |
|---|---|---|
| FR | 3014330 A1 | 6/2015 |
| WO | 03033120 A1 | 4/2003 |
| WO | 2014116514 A1 | 7/2014 |
| WO | 2015073698 A1 | 5/2015 |
| WO | 2017029305 A1 | 2/2017 |
| WO | 2017112547 A1 | 6/2017 |
| WO | 2017146637 A1 | 8/2017 |

\* cited by examiner

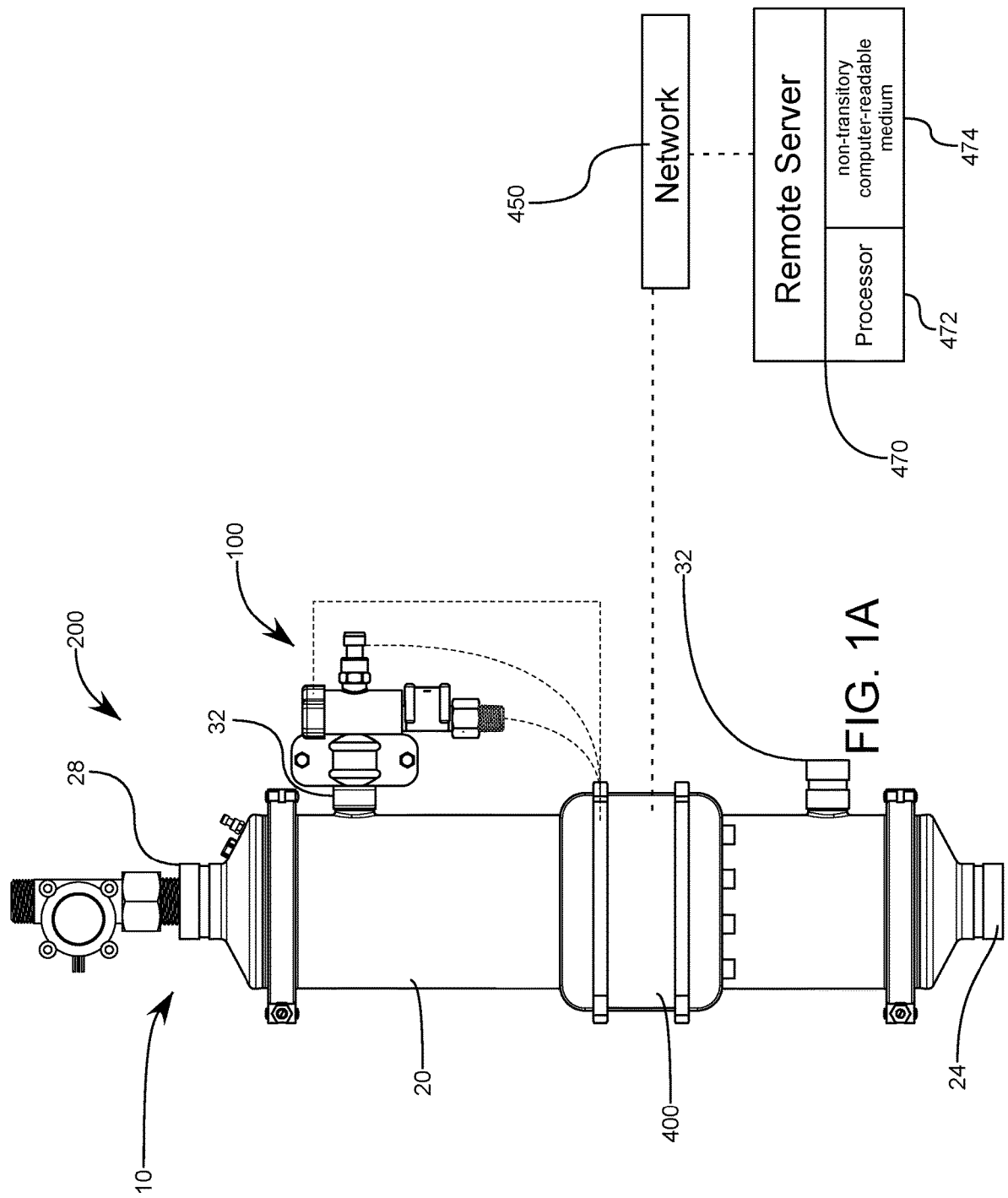

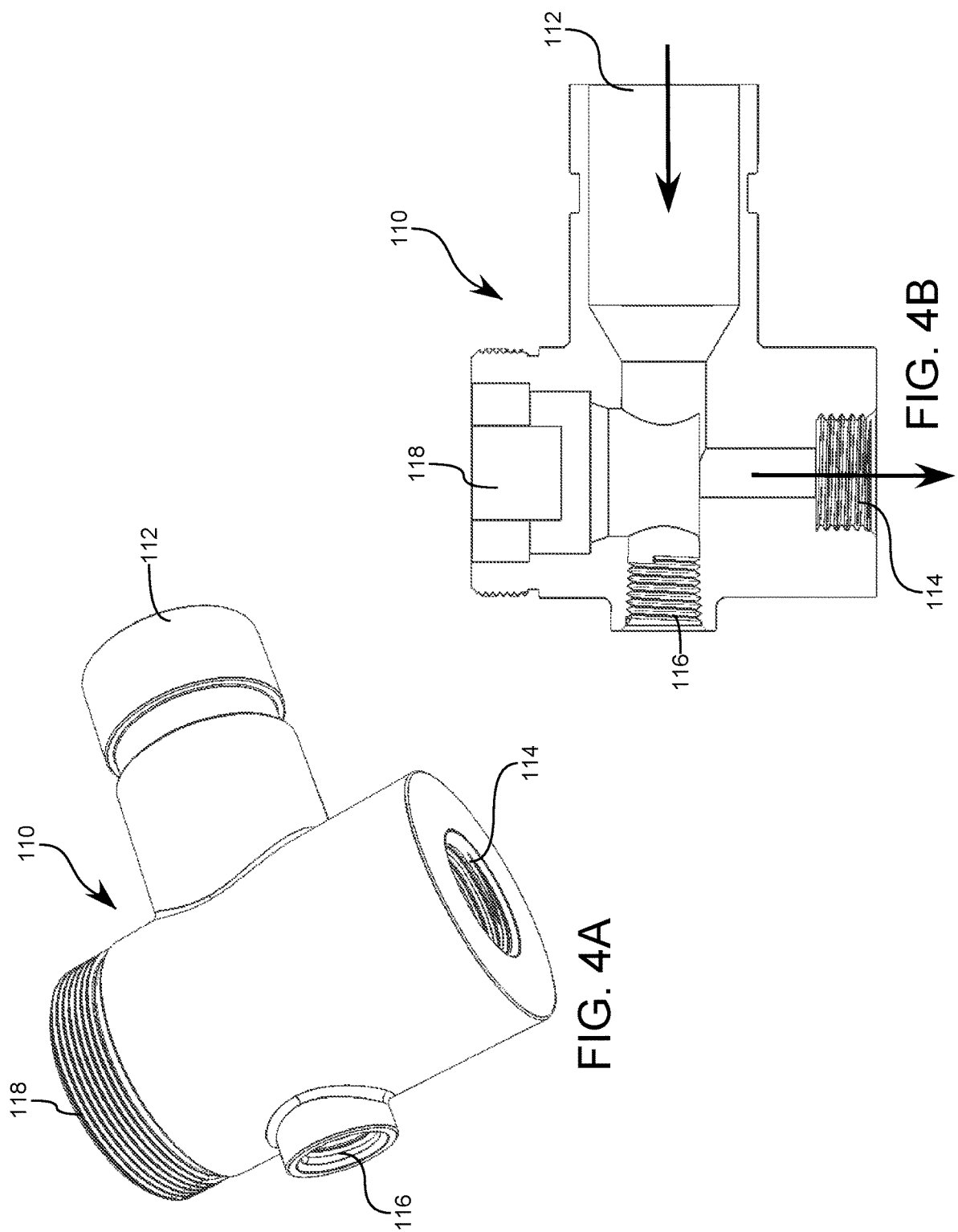

SMART FILTER MODULE ANALYSIS SYSTEM AND ASSOCIATED METHODS

TECHNICAL FIELD

The present disclosure generally relates to the field of monitoring systems, and more particularly to a filter module monitoring system in commercial water and liquid filtration using ceramic or polymeric membrane filters.

BACKGROUND

Filtration systems operate in a wide variety of applications, even when constrained to water filters. Such filters can be found anywhere from wastewater plants to nuclear power plants, and from commercial application, to hospitals. It is well understood that these systems operate in an optimal fashion when the filter medias are replaced or cleaned at very particular intervals. While changing or cleaning the filter media prematurely can ensure smooth operation, it can also result in unnecessary downtime, cause excess cost due to replacement cost, or damage to the filter media during unnecessary cleaning operations. Further, in particular environments, it can often require almost-constant supervision in order to determine precisely when a particular filter media needs replacement or cleaning.

While conventional filter medias typically have guidelines for when a filter media should be replaced, such as a particular timeline, these guidelines may or may not reflect actual filter media state or particle load depending on a wide variety of potential operating conditions. One of the intended benefits of the present application seeks to optimize filter media cleaning and replacement, while reducing unnecessary downtime given a wide variety of circumstances or environments about which the filter system may be used in.

SUMMARY OF THE INVENTION

Contemplated herein is a filter module analysis system configured to aide in the proper timing and scheduling of filter media cleaning and maintenance. The filter module analysis system can detect flow data and track the flow data so as to determine trends and provide predictions regarding the state of a particular filter module based on stored historical data and recognized trends based on various flow parameters and tracked historical data matching the flow parameters.

In order to provide the necessary analysis and provide accurate predictions a filter module analysis system is contemplated herein, the system including a filter module in accordance with various configurations which will be necessary for any number of filtration applications. Accordingly, the filter module can typically include a filter housing being provided with an inlet, a clean outlet, and a waste outlet. A filter element can then be provided within the housing which is configured to provide a clean output through the clean outlet and a waste output through the waste outlet. The filter media module will then be provided with a plurality of sensors, in this manner various aspects of the flow characteristics through the filter module can be determined and analyzed.

The system can then include a clean outlet sensor assembly about the clean outlet, the clean outlet sensor assembly including a plurality of sensors, the plurality of sensors being configured so as to detect one or more characteristics of the clean output exiting the clean outlet. Similarly, in some embodiments the system can also include a waste outlet sensor assembly, the waste outlet sensor assembly including a plurality of sensors, the plurality of sensors detecting one or more characteristics of a waste output exiting the waste outlet.

The system can then be provided with a data collection and network communication mechanism, the data collection and network communication mechanism having a processing unit being configured to receive signals from the plurality of sensors from both the clean outlet sensor assembly and the waste outlet sensor assembly, when included, wherein the data collection and network communication mechanism is configured to transmit the one or more characteristics of the clean output, and the one or more characteristics of the waste output over a wireless network, LAN network, Ethernet, closed network, open network, encrypted network and so forth.

The data collection and network communication mechanism of the system can then be connected to a remote server, the remote server having: a remote processing unit; and a non-transitory computer-readable medium; wherein the remote server is configured to receive the one or more characteristics of the clean output, and the one or more characteristics of the waste output from the data collection and network communication mechanism; and wherein the remote processing unit is configured to determine a filter media status from the one or more characteristics of the clean output, and the one or more characteristics of the waste output.

In some embodiments, the clean outlet sensor assembly can include at least one sensor selected from the group consisting of, a flow sensor, a turbidity sensor, a pH sensor, a conductivity sensor, a temperature sensor, and a pressure sensor. Similarly, the waste outlet sensor assembly can include at least one sensor selected from the group consisting of, a flow sensor, a turbidity sensor, a pH sensor, a conductivity sensor, a temperature sensor, and a pressure sensor. In yet additional embodiments the outlet sensor assembly can include all of: a flow sensor; a turbidity sensor; a pH sensor; a conductivity sensor; a temperature sensor; and a pressure sensor. Further, is some embodiments the waste outlet sensor assembly can include all of: a flow sensor; a turbidity sensor; a pH sensor; a conductivity sensor; a temperature sensor; and a pressure sensor.

In some embodiments, historical information regarding the filter media status and the one or more characteristics of the clean output, and the one or more characteristics of the waste output are stored on the non-transitory computer-readable medium of the remote server, and wherein the remote processing unit is configured to predict a plurality of future filter media statuses for one or more associated future times period based on an analysis of the historical information of the filter media status and the one or more characteristics of the clean output, and the one or more characteristics of the waste output.

In some embodiments, the processor can be configured to generate and provide an anticipated maintenance alert based on one or more trends recognized by the processing unit from the historical information.

Another advantage of the system described herein, is the ability to determine appropriate filter medias or filter types to be used in a given location based on the historical captured information from the turbidity, flow and pressure sensors. For example, certain filters can have different types of media having various membranes, materials, sizes, shapes, ion exchange features that all effect the filtration process. Having the ability to customize a filter module for a given location based on the location's unique requirements is enabled by the ability to track the associated data as discussed.

Also contemplated herein is a method of monitoring and analyzing a filter module, the method including the steps of: providing a filter module analysis system as outlined above; and determining a filter media status from the one or more characteristics of the clean output, and the one or more characteristics of the waste output; and providing a maintenance alert when the one or more characteristics of the clean output, or the one or more characteristics of the waste output reached a predetermined threshold.

In some embodiments the method can also include additional steps of storing historical information regarding the filter media status and the one or more characteristics of the clean output, and the one or more characteristics of the waste output are stored on the non-transitory computer-readable medium of the remote server; and predicting a plurality of future filter media statuses for one or more associated future times period based on an analysis of the historical information of the filter media status and the one or more characteristics of the clean output, and the one or more characteristics of the waste output. In some additional embodiments, the method can also include the step of generating and providing an anticipated maintenance alert based on one or more trends recognized by the processing unit from the historical information.

It will be appreciated that the various components can transmit data in accordance with IEEE 802.11a/b/g/n standard, generally referred as a WIFI transceiver. Additionally, the various components can be configured for transmission via RF, HF, LF, UHF, Microwave, ZigBee (IEEE 802.15.4), wired Ethernet (IEEE 802.3xx), wired Serial (RS-232/RS-485), cellular, LoRA, SigFox, or other narrow band internet of things systems/protocols, infrared, low-power wide-area, BLUETOOTH, and the like without departing from the scope and intent of the present disclosure.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such claims.

These aspects of the invention are not meant to be exclusive and other features, aspects, and advantages of the present invention will be readily apparent to those of ordinary skill in the art when read in conjunction with the following description, appended claims, and accompanying drawings. Further, it will be appreciated that any of the various features, structures, steps, or other aspects discussed herein are for purposes of illustration only, any of which can be applied in any combination with any such features as discussed in alternative embodiments, as appropriate.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention, wherein:

FIGS. 1A-B illustrate front and perspective views of a filter module analysis system in accordance with various aspects of the present invention;

FIGS. 4A-B illustrate a perspective and side cross sectional view of a clean output sensor housing adaptable for use in the filter module analysis system of FIGS. 1A-B in accordance with various aspects of the present invention;

DETAILED DESCRIPTION OF THE INVENTION

It will be appreciated by those having skill in the area of that filtration systems, and particularly high input and output industrial waste water filtration systems, can be extremely complex systems with service and replacement schedules that vary greatly depending on the application. Additionally, load requirements vary greatly based on contaminant load, flow, output requirements etc. As such recommendations of service and replacement can be extremely difficult to predict. It will also be appreciated that failure of these filtration systems can cause great harm to system processes which rely thereon. Further, the downtime required to replace or clean any filter media within these filtration systems can costs a large number of man hours, or loss of productivity while the system is down.

Figure 1B:
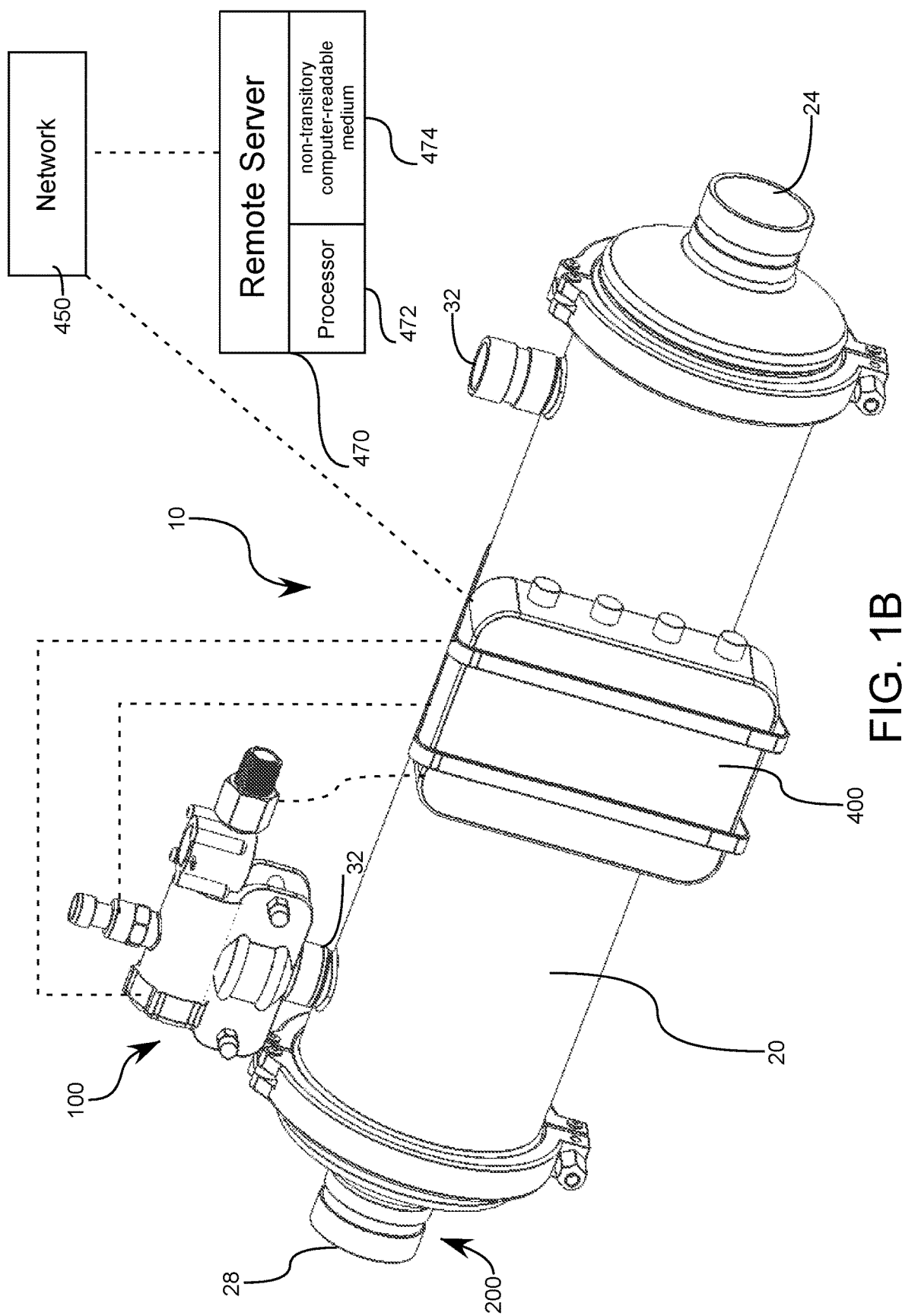
Figure 2:
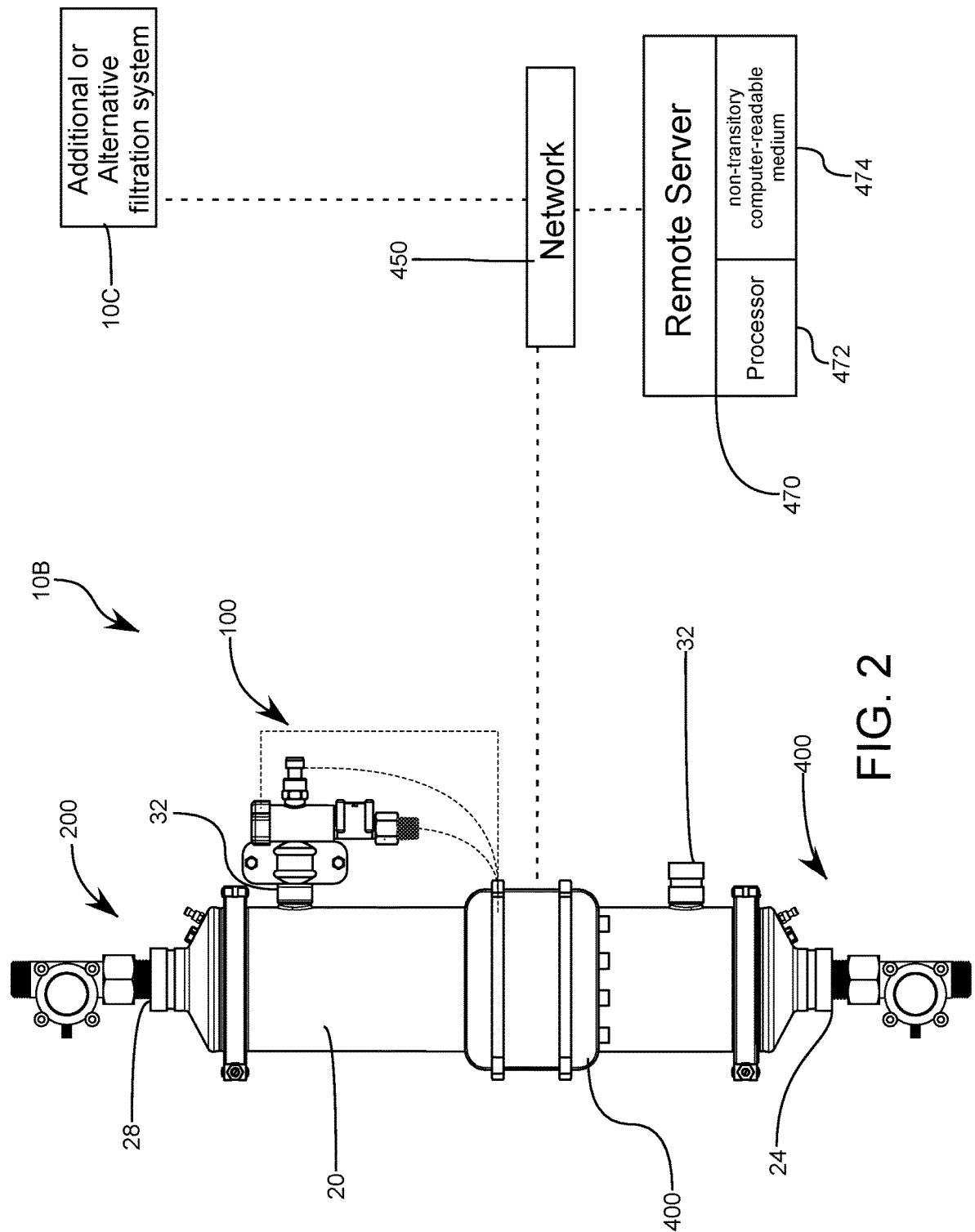
FIG. 2 illustrates a side perspective view of an alternative embodiment of a filter module analysis system in accordance with various additional aspects of the present invention.

In order to minimize downtime and maximize accuracy of a maintenance schedule, aid in the protection of these systems, as well as the maximization of operation time and reduction of maintenance cost, a filter element analysis system 10, as shown in FIGS. 1-2, is contemplated herein which is configured to aide in allowing for proper timing and scheduling of filter media maintenance.

In order to provide the necessary analysis and provide accurate predictions a filter module analysis system 10 or 10B can be provided as shown. Accordingly, the filter module 10 can typically include a filter housing 20 being provided with an inlet 24, one or more clean outlets 32, and a waste outlet 28.

It will be appreciated that the housing 20 can contain any number of different types of filter media therein, such media can include ceramic or polymeric microfilters, ceramic or polymeric ultrafilters, nanofilters, fiber filters, deionization resin, various suitable membranes, reverse osmosis, etc. It will be appreciated that the filter can thus be configured to provide a clean output through the clean outlet 32 and a waste output through the waste outlet 28. The filter module 10 can then be provided with a plurality of sensors or sensor assemblies 100, 200, or 300, in this manner various aspects of the flow characteristics through the filter module can be determined and analyzed.

In some embodiments, and as shown in FIGS. 1-4, the system 10 can then include a clean outlet sensor assembly 100 about at least one clean outlet 32, the clean outlet sensor assembly 100 can include a plurality of sensors, the plurality of sensors being configured so as to detect one or more characteristics of the clean output exiting the clean outlet. Similarly, in some embodiments the system can also include a waste outlet sensor assembly 200, the waste outlet sensor assembly 200 can also include a plurality of sensors, the plurality of sensors detecting one or more characteristics of a waste output exiting the waste outlet 28.

As such, the filter module analysis system 10 can then be configured to aide in the proper timing and scheduling of filter media cleaning and maintenance. The filter module analysis system can be configured to detect flow data and track the flow data so as to determine trends and provide predictions regarding the state of the filtration system based on stored historical data and recognized trends based on various flow parameters and tracked historical data matching the flow parameters. It will be appreciated that trends can be extrapolated as appropriate to a future time and based on when the flow characteristics reach a predefined threshold, a maintenance event can then be scheduled or predicted as being needed at a given time based on the flow parameters. For example, a turbidity sensor located on the clean outlet 32 can determine a particulate count in the clean side output, the trend of sensed particulates can be tracked and extrapolated out, and when the system predicts that the particular count will rise above a predetermined level or threshold, a maintenance event can be scheduled, an alert generated, etc.

The system 10 can also be provided with a data collection and network communication mechanism 400, the data collection and network communication mechanism 400 can be provided with a processing unit therein which can be configured to receive and process signals from the plurality of sensors from both the clean outlet sensor assembly 100 and the waste outlet sensor assembly 200, or an inlet sensor assembly 300 as shown in FIG. 2, when included. The data collection and network communication mechanism 400 can then be configured to transmit process the data locally using the processing unit provided therein. Alternatively, the data collection and network communication mechanism 400 can instead be configured to connect to a remote server using any number of wired or wireless connection means so as to enable the data collection and network communication mechanism 400 to transmit the sensor data over a network 450. In this manner the data can be transmitted to a remote server 470, the remote server 470 having: a remote processing unit 472 and a non-transitory computer-readable medium 474; wherein the remote server 470 is configured to receive the one or more characteristics of the clean output, and the one or more characteristics of the waste output from the data collection and network communication mechanism 400; and wherein the remote processing unit 472 is configured to determine a filter media status from the one or more characteristics of the clean output, and the one or more characteristics of the waste output.

Figure 3B:
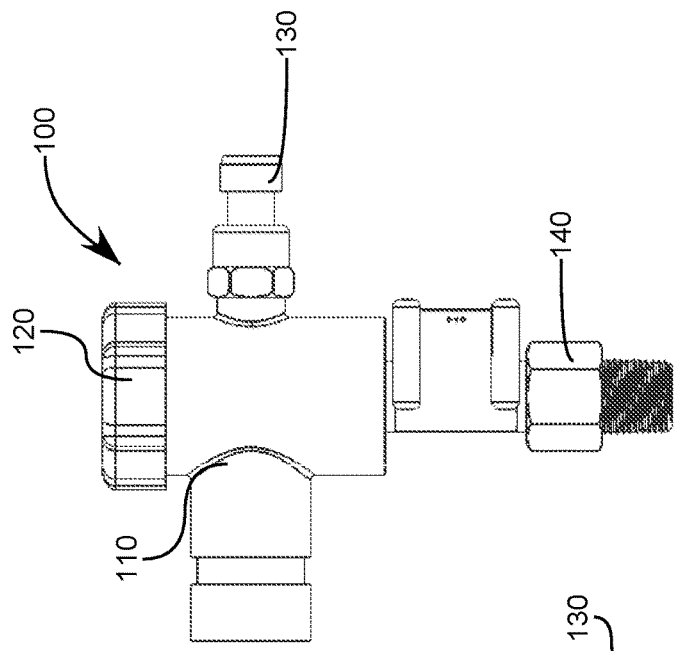
FIGS. 3A-C illustrate various front and perspective views of a clean output sensor assembly adaptable for use in the filter module analysis system of FIGS. 1A-B in accordance with various aspects of the present invention.
Figure 3C:
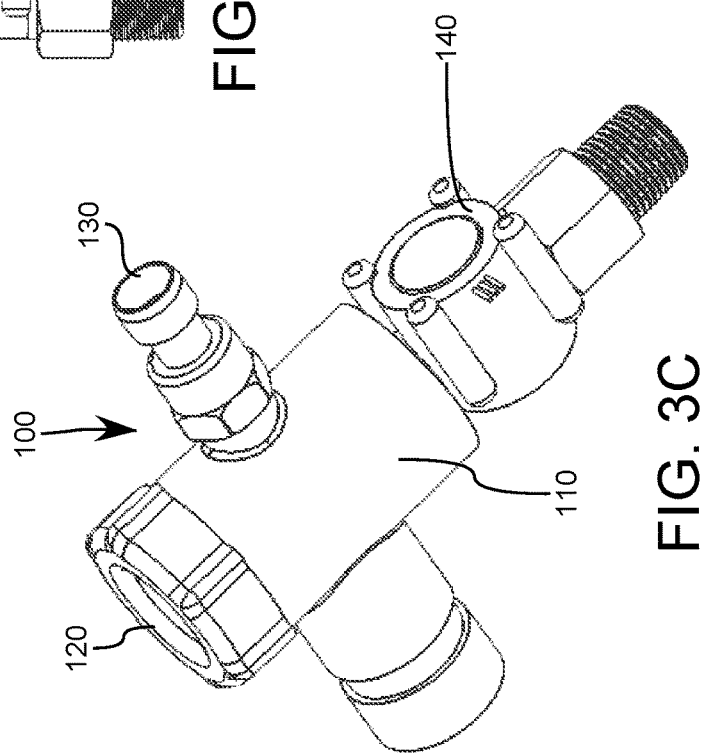
Figure 3A:
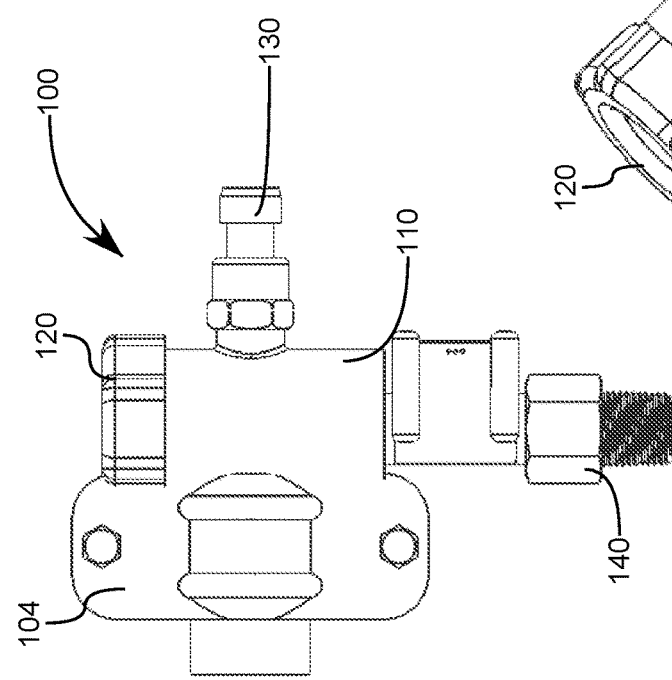

In some embodiments, and as shown in FIGS. 3-4 the clean outlet sensor assembly 100 can include a flow sensor 140, a turbidity sensor 120, and a pressure sensor 130. It will be appreciated that the clean outlet sensor assembly 100 can be provided with a housing 110 which can have ports or other attachment means for connecting the various sensors. Port 118 for connecting to turbidity sensor 120, port 116 for connecting to pressure sensor 130, and an outlet or flow through port 114 configured to attach to flow sensor 140. It will be appreciated that the housing 110 can be formed unitarily with the filter housing 20 such that the outlet of the filter housing 32 is unitary with the inlet of the clean outlet sensor assembly, however, as shown a bracket 104 or other adapter can be used to retrofit the clean outlet sensor assembly 100 to a pre-existing filtration system or module.

Similarly, the waste outlet sensor assembly 200 can include various sensors including, a flow sensor 240 provided at an outlet 28, a turbidity sensor 220 provided at a sensor port 218, and a pressure sensor 230 provided at a pressure port 216. It will be appreciated that the waste output housing 210 can be formed unitarily with the filter housing 20.

Figure 6:
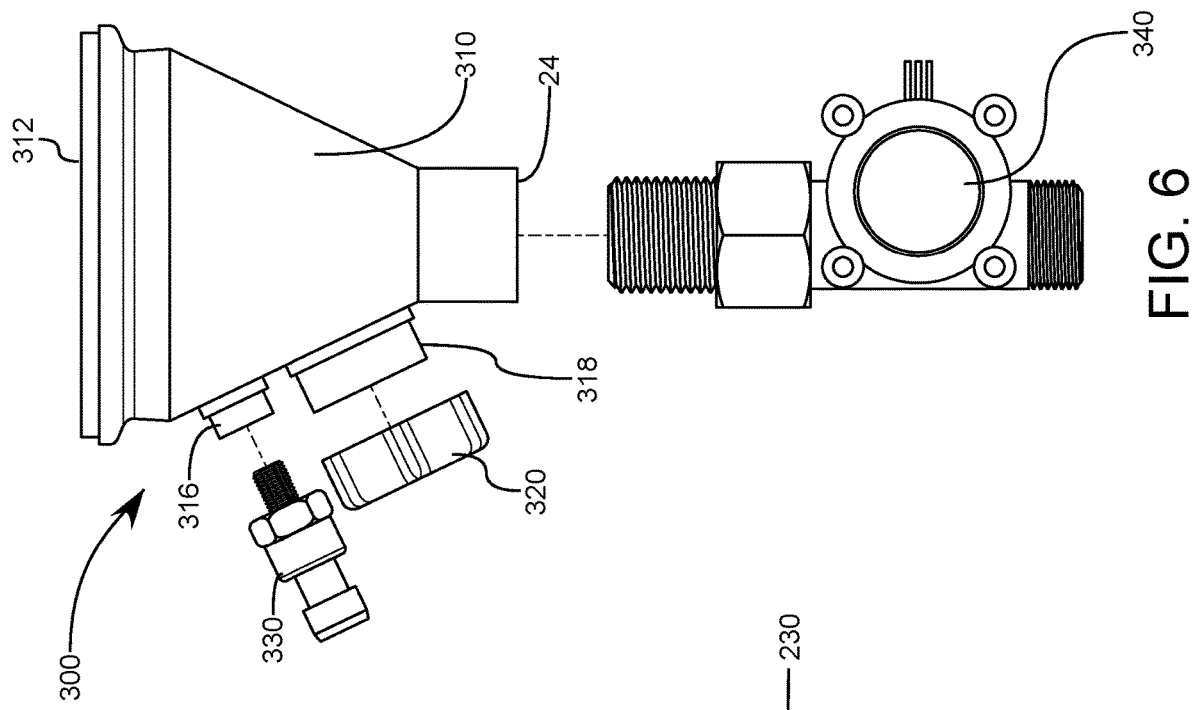
FIG. 6 illustrates a side exploded view of an inlet sensor assembly adaptable for use in the filter module analysis systems of FIGS. 1-2 in accordance with various aspects of the present invention.
Figure 5:
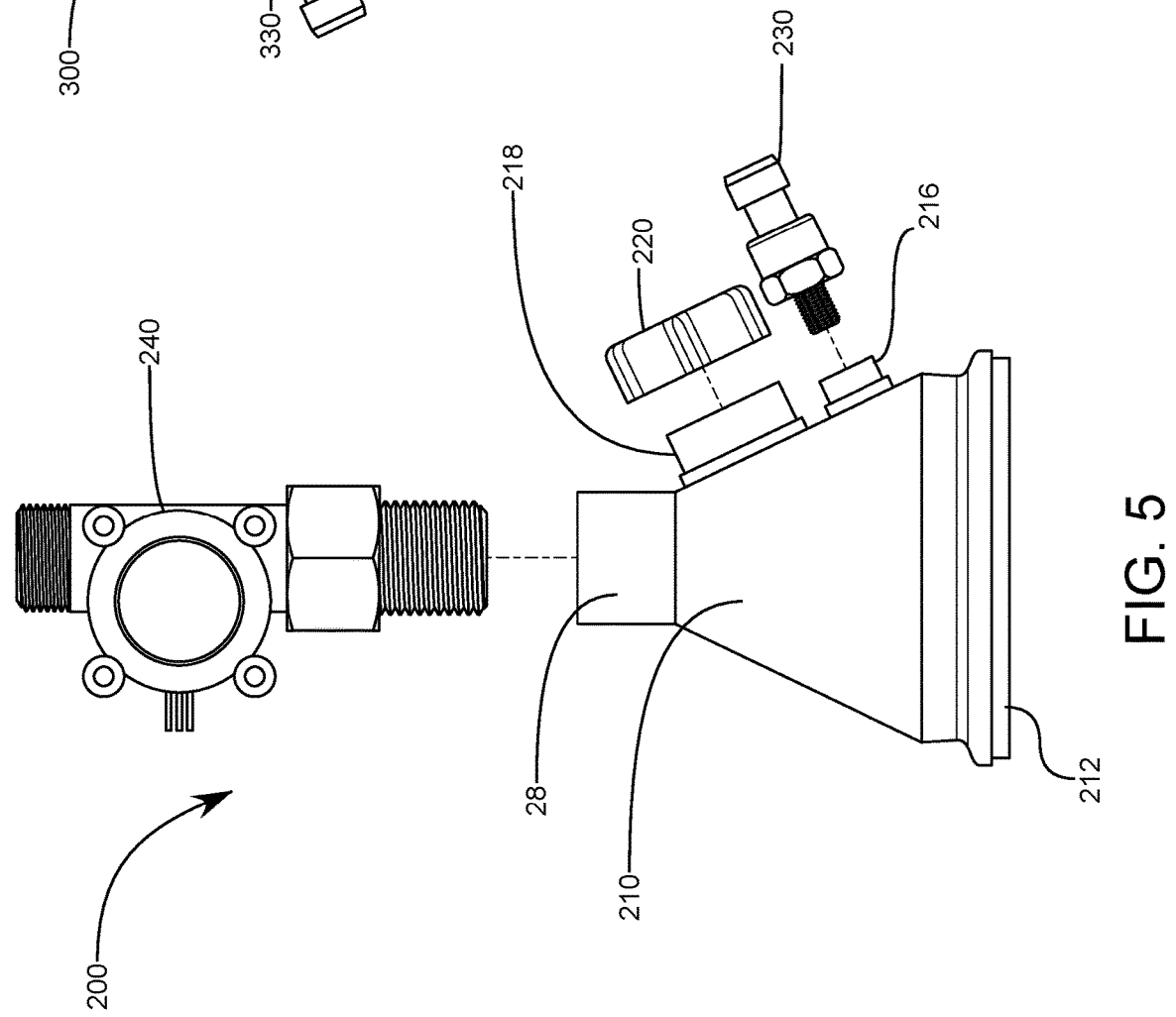
FIG. 5 illustrates a side exploded view of a waste output sensor assembly adaptable for use in the filter module analysis systems of FIGS. 1-2 in accordance with various aspects of the present invention.

FIG. 6 illustrates an optional inlet sensor assembly 300 that can be optionally provided about the inlet 24 of the filter housing 20. The inlet sensor assembly 200 can include various sensors including, a flow sensor 340 provided at an inlet 24, a turbidity sensor 320 provided at a sensor port 318, and a pressure sensor 330 provided at a pressure port 316. It will be appreciated that the inlet housing 310 can be formed unitarily with the filter housing 20. It will be appreciated that this inlet sensor assembly 300 can be configured to provide data about the flow characteristics of the dirty or contaminated water or fluid being provided to the filter module, such that inlet flow parameters, which can fluctuate based on system functions or other ancillary processes can be monitored, and their effect on the degradation of the filter media determined and better predicted over time.

It will be appreciated that while the shown embodiments illustrate sensors at both the clean and waste outputs of the filter housing 20, as well as at the inlet, that pressure, turbidity, flow sensors, or any other desired sensor can be provided in any combination of the same wherein any sensor or assembly can be duplicated, omitted, or replaced with a different flow characteristic sensor so as to track any desired metric.

In some embodiments, historical information regarding the filter media status and the one or more characteristics of the clean output, and the one or more characteristics of the waste output, can be recorded and analyzed. As such, this historical information can be stored locally or on the non-transitory computer-readable medium 474 of the remote server 470. In this manner, the remote processing unit can be configured access and analyze the historical information so as to generate predictions with regard to a plurality of future filter media statuses for one or more associated future times period based on an analysis of the historical information. It will be understood that the historical information can include at least the one or more characteristics of the clean output, the one or more characteristics of the waste output, and one or more characteristics of the inlet.

In some embodiments, the processor 472 can be configured to generate and provide an anticipated maintenance alert based on one or more trends recognized by the processing unit from the historical information.

Figure 7:
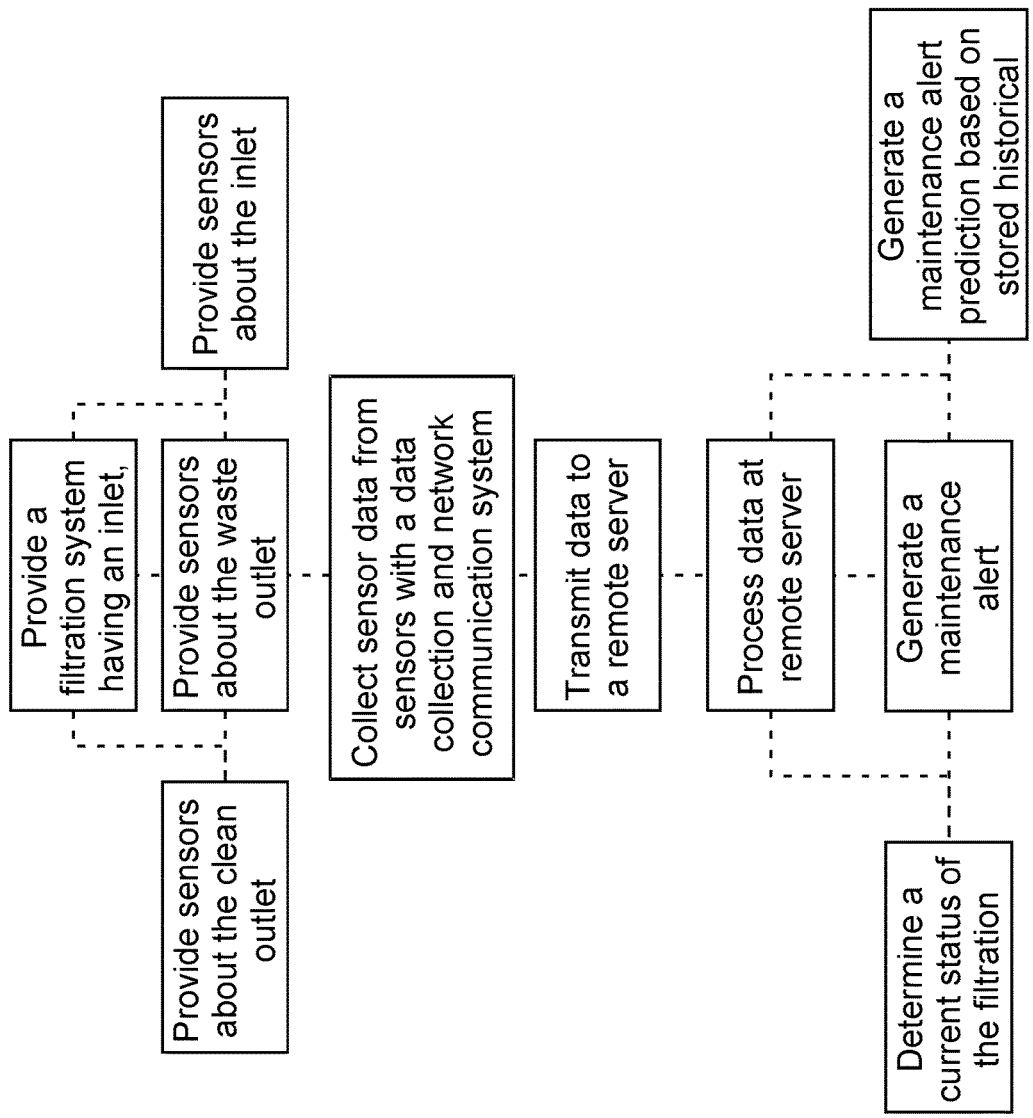
FIG. 7 illustrates an exemplary flow chart of a method of using the filter module analysis system in accordance with various aspects of the present invention.

Also contemplated herein, and as illustrated in FIG. 7, is a method of monitoring and analyzing a filtration as described above, the method can include: providing a filter module analysis system as outlined above; and determining a filter media status from the one or more characteristics of the clean output, and the one or more characteristics of the waste output; and providing a maintenance alert when the one or more characteristics of the clean output, or the one or more characteristics of the waste output reached a predetermined threshold.

In some embodiments the method can also include additional steps of storing historical information regarding the filter media status and the one or more characteristics of the clean output, and the one or more characteristics of the waste output are stored on the non-transitory computer-readable medium 474 of the remote server 470; and predicting a plurality of future filter media statuses for one or more associated future times period based on an analysis of the historical information of the filter media status and the one or more characteristics of the clean output, and the one or more characteristics of the waste output. In some additional embodiments, the method can also include the step of generating and providing an anticipated maintenance alert based on one or more trends recognized by the processing unit from the historical information.

Figure 8:
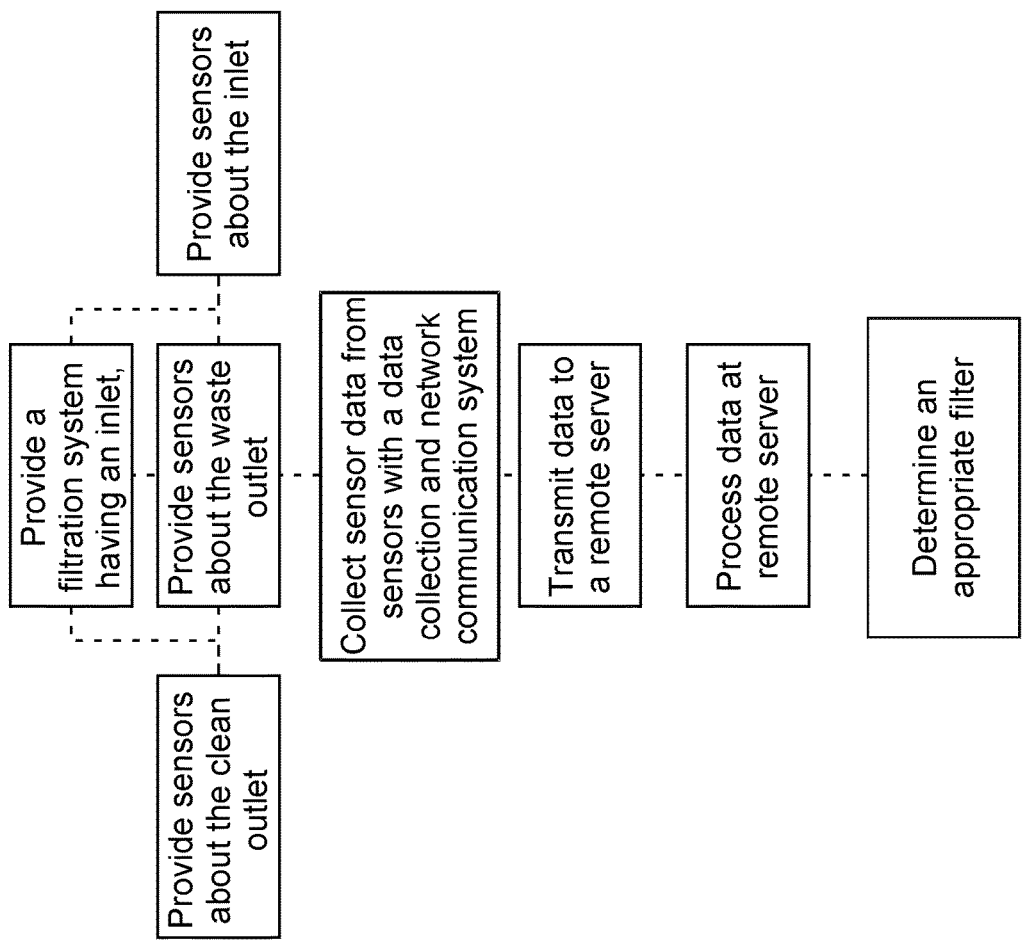
FIG. 8 illustrates an exemplary flow chart of a method of using the filter module analysis system in accordance with various aspects of the present invention to recommend future filter medias.

A filter media determination method is provided FIG. 8. The filter media determination method includes: providing a filter module having at least one inlet and one outlet. In various embodiments, the sensors, including flow, sensor and turbidity, are provided about the inlet, the outlet or both. The sensor data from each of the sensors is collected by a data collection and network communication system, the data is then transmitted to a remote server or database where analysis can be performed on said data. The analysis can be used to predict an appropriate filter media for future use based on given historical data for the particular site.

Figure 9:
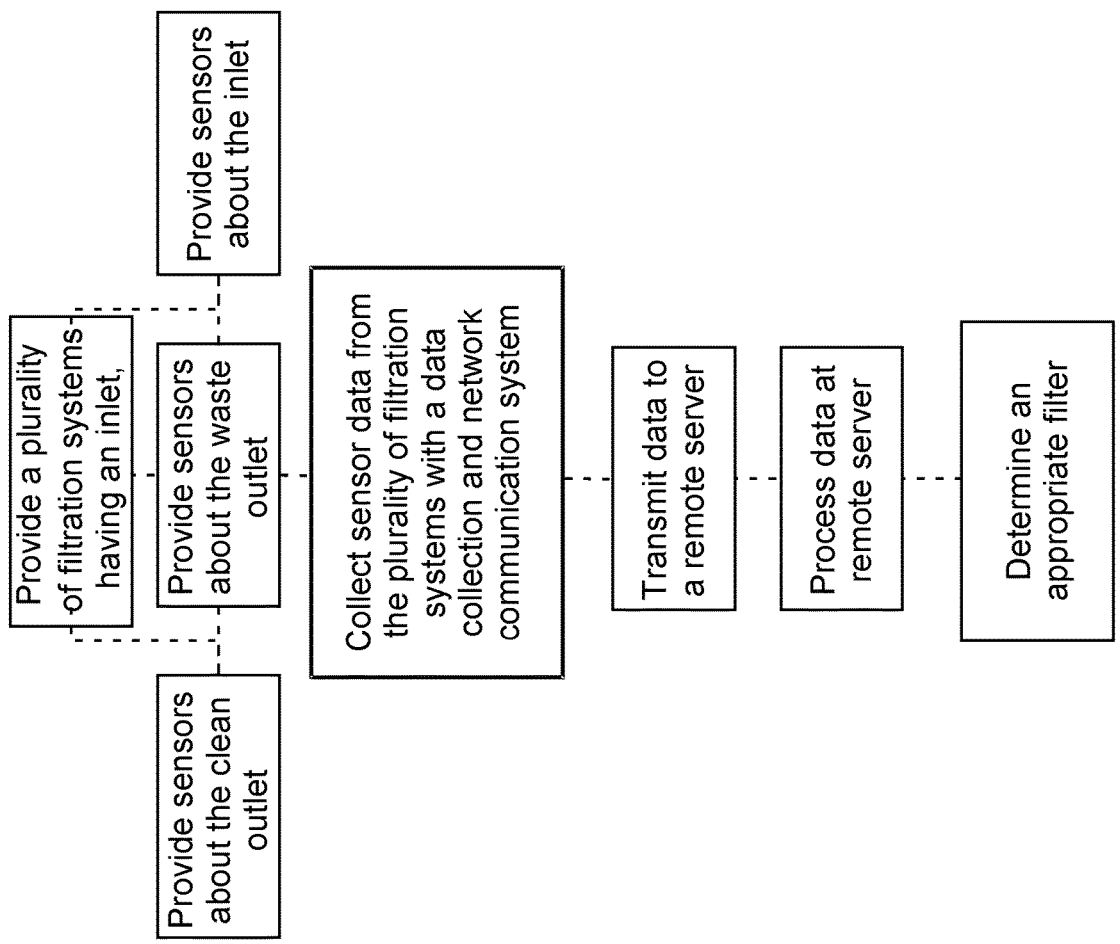
FIG. 9 illustrates an exemplary flow chart of a method of using a plurality of filter module analysis systems in accordance with various aspects of the present invention.

Additional data can be collected from other filter modules 10C used at the same site, or other sites, as illustrated in FIGS. 2 and 9, including those using the same and/or different types of filter media. This information can also be used to determine a filter media recommendation. As implied, it should be understood that a given filter module is configured or adapted to accept multiple filter media types, materials, etc.

It is understood in that modifying the types of membrane, material, size, shape, ion exchange features as well as other parameters has correlated effect on the filtration process. Having the ability to customize a filter media for a given location based on the location's unique requirements is enabled by the ability to track the associated data as discussed.

Figure 10:
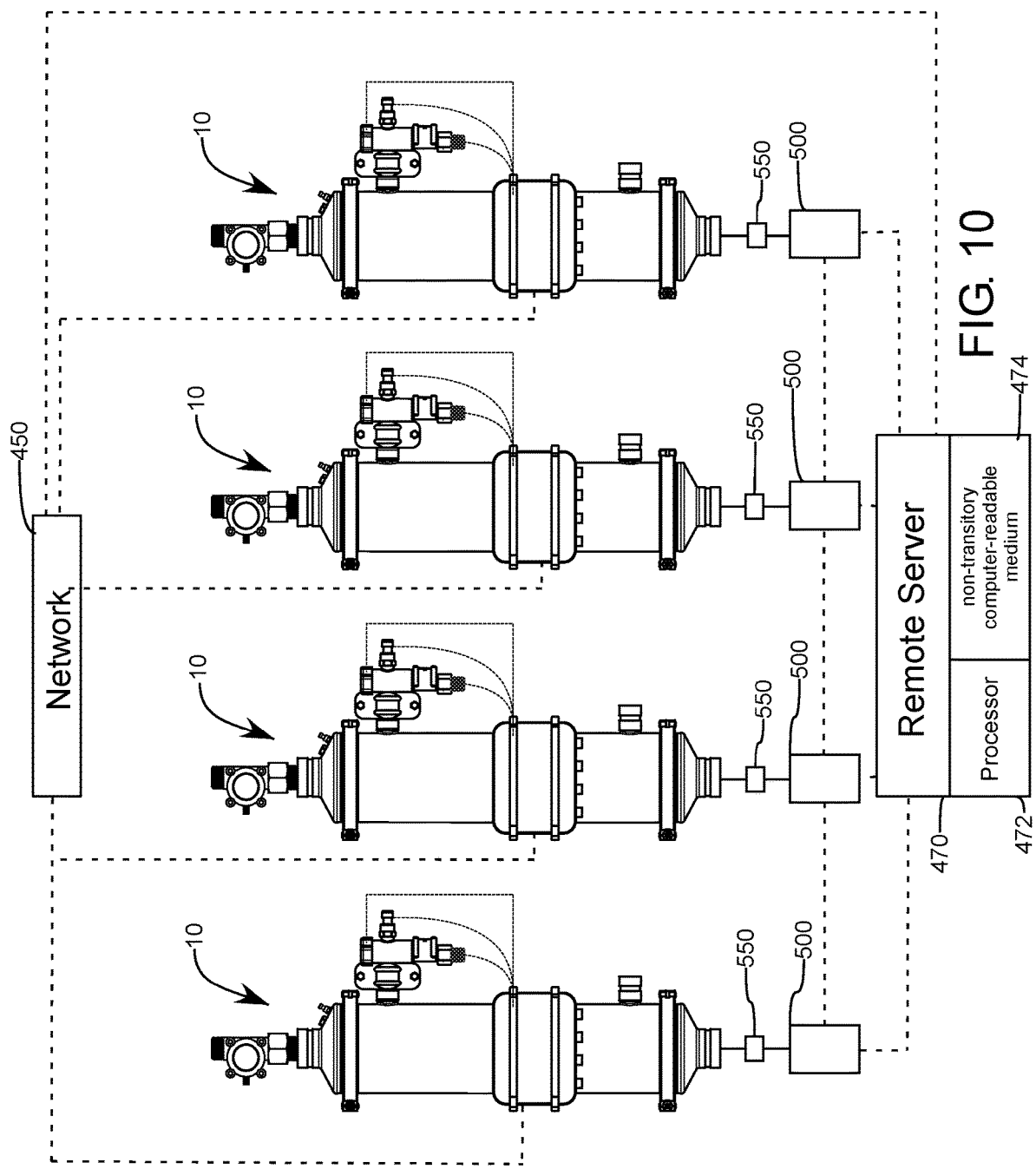
FIG. 10 illustrates a side schematic view of a filter module utilizing a plurality of filter modules with associated analysis systems.

FIG. 10. illustrates how the filter module analysis system 10 can be used in parallel or series such that multiple filter module analysis systems 10 can be configured to share data across multiple modules in a singular overarching system, or alternatively communicate with, or access data from, filter module analysis systems being located at remote locations in having different flow characteristics and parameters. In some embodiments, the filtration analysis systems can be integrated into more complex systems and also be configured to electronically attach to pumps 500 or valves 550 so as to control the flow rates and pressures of a given module 10 based on sensed data from the various associated sensor modules. In this manner, based on detected flow characteristics and parameters detected in a particular location and historical data recorded from alternative locations having various filter media types and flow characteristics and parameters, the system can then generate recommendations regarding a best media type, most efficient flow parameters, etc. so as to optimize performance of a particular filter module. Such optimization might include varying flow or pressure at the inlet, recommending a particular media type, servicing schedules, replacement schedules, etc.

In some embodiments, the system, either individual modules, or those having multiple modules, can be self-regulated based on sensed data from the sensor modules. For example, the system, based on historical data can determine that a particular flow rate or pressure provides better longevity given a certain set of flow characteristics, such as contaminant load etc. In response to the sensed data, and in response to historical data, the flow and the pressure at the inlet can be automatically regulated to match calculated optimal flow and pressure. Alternatively, data corresponding to a failure in one particular module can cause the valve 550 to close or be appropriately throttled, or the pump to turn off for that particular module until appropriate service has been performed.

In yet additional embodiments the historical data can also include information regarding permeability of the filter media or membrane. In such instances the relative effective surface area of a particular filter media or membrane can be input into the system upon installation and the permeability can be derived from the flow, pressure, and surface area for a given time frame so as to allow for optimization of particular media parameters based on the permeability given certain operating conditions over a particular timeframe.

In order to track permeability or flux through the filter media and an associated relative performance, which is typically given in relation to a particular transmembrane pressure (TMP):

$$TMP = \left(\frac{\text{(inlet pressure)} + \text{(waste outlet pressure)}}{2}\right) - \text{(clean outlet pressure)}$$

Once the transmembrane pressure is calculated the permeability can then be derived based on a volume through the membrane, the membrane surface area, over a particular time period or as expressed as a rate such as a flux, for a given TMP. For example, flux is expressed as:

$$\frac{\left(\frac{\text{Volume}}{\text{Surface Area}}\right)}{\text{time}}$$

as opposed to flow, which is merely:

$$= \frac{\text{Volume}}{\text{time}}$$

The permeability or flux can then be determined with its relation to the TMP so as to provide historical data which can then be utilized in predicting optimal filter media parameters for a given application.

As discussed, it will be appreciated that the formulas and sensors above on the outlet waste, outlet clean and/or inlet water can be used in various prediction models to determine a variety of factors mentioned. These models can look like: Servicing of filter media module is derived from the factors of: (current permeability, time, filter media type, filter media size, particulate size exiting dirty, particulate size exiting clean, previous servicing, historical information associated with other filter modules in the same facility, historical information associated with filter modules in remote locations, volume of fluid, change of permeability over time, required clean output, current flow rate, target flow rate, current pressure out (clean, dirty), target pressure (clean, dirty), average particulate size on (clean, dirty) outlet, change of average particulate size on (clean, dirty) outlet, type of fluid being filtered (e.g. a processing plant uses different chemicals to process different materials or switching the type of juice being processed) as well as other factors mentioned herein. Not all of these factors are necessarily used to determine the servicing recommendation, but any combination can be used as part of a predictive process for determining servicing of the filter media module. Servicing includes any one of cleaning the filter media, changing the filter media out, changing the filter media type, back or reverse flushing the system. Other predictive model types discussed herein, include determining a type of filter media module (size, media type, multiple modules in parallel or series) based on a combination of the factors lister above including historical data for comparative systems as well as desired target clean output characteristics.

It will be appreciated that the various components can transmit data in accordance with IEEE 802.11a/b/g/n standard, generally referred as a WIFI transceiver. Additionally, the various components can be configured for transmission via RF, HF, LF, UHF, Microwave, ZigBee (IEEE 802.15.4), wired Ethernet (IEEE 802.3xx), wired Serial (RS-232/RS-485), cellular, LoRA, SigFox, or other narrow band internet of things systems/protocols, infrared, low-power wide-area, BLUETOOTH, and the like without departing from the scope and intent of the present disclosure.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such claims.

These aspects of the invention are not meant to be exclusive and other features, aspects, and advantages of the present invention will be readily apparent to those of ordinary skill in the art when read in conjunction with the following description, appended claims, and accompanying drawings. Further, it will be appreciated that any of the various features, structures, steps, or other aspects discussed herein are for purposes of illustration only, any of which can be applied in any combination with any such features as discussed in alternative embodiments, as appropriate.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention. Additionally, any features, structures, components, method steps which are discussed in reference to any one of the aforementioned embodiments are readily adaptable for use into and with any features of the other alternative embodiments discussed therein, with the understanding that one of ordinary skill in the art will be capable of assessing the ability of the various embodiments disclosed and be capable of making such adaptations.

What is claimed:

1. A method of monitoring and analyzing a filter module, the method comprising the steps of:

providing a filter module having a filter media arranged in a filter housing, the filter housing being provided with an inlet, a clean outlet, and a waste outlet;

providing an inlet sensor assembly, the inlet sensor assembly including a plurality of sensors;

detecting of one or more characteristics of an input flow at the inlet of the filter module;

wherein the inlet sensor assembly further comprises a turbidity sensor, a pressure sensor, and a flow sensor;

providing a clean outlet sensor assembly, the clean outlet sensor assembly including a plurality of sensors, the plurality of sensors detecting one or more characteristics of a clean output exiting the clean outlet;

wherein the clean outlet sensor assembly further comprises a pressure sensor, and a flow sensor;

providing a waste outlet sensor assembly, the waste outlet sensor assembly including a plurality of sensors including a pressure sensor, the plurality of sensors detecting one or more characteristics of a waste output exiting the waste outlet;

providing a data collection and network communication mechanism, the data collection and network communication mechanism further comprising:

a processing unit being configured to receive signals from the plurality of sensors of the clean outlet sensor assembly, from the plurality of sensors of the inlet sensor assembly, and from the plurality of sensors of the waste outlet sensor assembly;

wherein the data collection and network communication mechanism is configured to transmit the one or more characteristics of the clean output, and the one or more characteristics of the waste output over a network;

providing a remote server in electronic communication with the data collection and network communication mechanism, the remote server arranged remotely away from the data collection and network communication mechanism and communicating with the data collection and network communication mechanism over the network, the server further comprising:

a processing unit; and a non-transitory computer-readable medium;

receiving the one or more characteristics of the clean output, and the one or more characteristics of the waste output from the data collection and network communication mechanism by the remote server;

determining an inlet pressure from the pressure sensor of the inlet sensor assembly;

determining a clean outlet pressure from the pressure sensor of the clean out sensor assembly;

determining a waste outlet pressure from the pressure sensor of the waste outlet sensor assembly;

calculating a transmembrane pressure (TMP) of the filter media, by the formula:

$$TMP = (\text{inlet pressure} + \text{waste outlet pressure})/2 - \text{clean outlet pressure};$$

determining a clean outlet flow rate from the flow sensor of the clean outlet sensor assembly;

using a filter surface area of the filter media, calculating a permeability (P) of the filter media by:

$$P = (\text{clean outlet flow rate})/(\text{filter surface area});$$

trending the permeability in relation to the transmembrane pressure, and storing in historical information of the remote server;

determining a filter module status from the one or more characteristics of the clean output, and the one or more characteristics of the waste output; and providing a maintenance alert when the one or more characteristics of the clean output, or the one or more characteristics of the waste output reached a predetermined threshold;

wherein the processing unit of the remote server is configured to recognize one or more trends of hte one or more characteristics of the clean output, and the one or more characteristics of the waste output;

determining a recommended filter media to be used in the filter module based on the trending permeability of the filter media and historical information.

2. The method of monitoring and analyzing a filter module of claim 1, wherein
the clean outlet sensor assembly further comprises
a turbidity sensor.

3. The method of monitoring and analyzing a filter module of claim 2, wherein
the clean outlet sensor assembly further comprises
a turbidity sensor.

4. The method of monitoring and analyzing a filter module of claim 3, further comprising:
storing historical information regarding the filter module status and the one or more characteristics of the clean output, and the one or more characteristics of the waste output on the non-transitory computer-readable medium of the remote server; and
predicting a plurality of future filter module statuses for one or more associated future time periods based on an analysis of the historical information of the filter module status and the one or more characteristics of the clean output, and the one or more characteristics of the waste output.

5. The method of monitoring and analyzing a filter module of claim 1, wherein
the waste outlet sensor assembly further comprises
at least one sensor selected from the group consisting of, a flow sensor, and a turbidity sensor.

6. The method of monitoring and analyzing a filter module of claim 1, wherein
the waste outlet sensor assembly further comprises:
a flow sensor;
a turbidity sensor.

7. The method of monitoring and analyzing a filter module of claim 6, further comprising:
storing historical information regarding the filter module status and the one or more characteristics of the clean output, and the one or more characteristics of the waste output on the non-transitory computer-readable medium of the remote server; and
predicting a plurality of future filter module statuses for one or more associated future time periods based on an analysis of the historical information of the filter module status and the one or more characteristics of the clean output, and the one or more characteristics of the waste output.

8. The method of monitoring and analyzing a filter module of claim 6, further comprising:
generating and providing an anticipated maintenance alert based on one or more trends recognized by the processing unit from the historical information.

9. The method of monitoring and analyzing a filter module of claim 1, wherein
the waste outlet sensor assembly further comprises:
a flow sensor;
a turbidity sensor.

10. The method of monitoring and analyzing a filter module of claim 1, further comprising:
providing an inlet sensor assembly having a plurality of sensor indicative of one or more characteristics of an input flow.

11. A method of determining an appropriate media for use in a filter module, the method comprising the steps of:
providing a filter module having a filter media, and a filter housing, wherein the filter housing has at least one inlet, a clean outlet, and a waste outlet;
providing at least one of:
a clean outlet sensor assembly, the clean outlet sensor assembly including a plurality of sensors, the plurality of sensors detecting one or more characteristics of a clean output exiting the clean outlet, or
a waste outlet sensor assembly, the waste outlet sensor assembly including a plurality of sensors, the plurality of sensors detecting one or more characteristics of a waste output exiting the waste outlet;
providing a data collection and network communication mechanism, the data collection and network communication mechanism further comprising:
a processing unit being configured to receive signals from the plurality of sensors of the clean outlet sensor assembly, or from the plurality of sensors of the waste outlet sensor assembly;
determining an inlet pressure from a pressure sensor of an inlet sensor assembly;
determining a clean outlet pressure from a pressure sensor of the clean outlet sensor assembly;
determining a waste outlet pressure from a pressure sensor of the waste outlet sensor assembly;
determining a clean outlet flow rate from a flow sensor of the clean outlet sensor assembly;
wherein the data collection and network communication mechanism is configured to transmit data associated with one or more characteristics of the clean output, or the one or more characteristics of the waste output over a network;
receiving by a remote server transmitted data from the data collection and network communication mechanism;
calculating a transmembrane pressure (TMP) of the filter media, by the formula:

$TMP=$(inlet pressure+waste outlet pressure)$/2-$clean outlet pressure;

using a filter surface area of the filter media, calculating a permeability (P) of the filter media by:

$P=$(clean outlet flow rate)$/$(filter surface area);

tending the permeability in relation to the transmembrane pressure, and storing in historical information of the remote server;
determining a recommended filter media to be used in the filter module based on the data received by the remote server.

12. The method of determining an appropriate media for use in a filter module of claim 11, further comprising the step of:
receiving by the remote server data associated with a plurality filter modules, and wherein the determining step is based also on the data associated with the plurality filter modules.

13. A method of monitoring and analyzing a filter module, the method comprising the steps of:
    providing a filter module having a filter housing, the filter housing being provided with an inlet, a clean outlet, and a waste outlet;
    providing a clean outlet sensor assembly, the clean outlet sensor assembly comprising:
        a flow sensor;
        a turbidity sensor; and
        a pressure sensor;
        wherein the flow sensor, the turbidity sensor, and the pressure sensor provide data regarding one or more characteristics of a clean output exiting the clean outlet;
    providing a waste outlet sensor assembly, the waste outlet sensor assembly comprising:
        a flow sensor;
        a turbidity sensor; and
        a pressure sensor;
        wherein the flow sensor, the turbidity sensor, and the pressure sensor of the waste outlet sensor assembly provide data regarding one or more characteristics of a waste output exiting the waste outlet;
    providing a data collection and network communication mechanism, the data collection and network communication mechanism further comprising:
        a processing unit being configured to receive signals from the flow sensor, the turbidity sensor, and the pressure sensor of the waste outlet sensor assembly, and configured to receive signals from the flow sensor, the turbidity sensor, and the pressure sensor of the clean outlet sensor assembly;
        wherein the data collection and network communication mechanism is configured to transmit the one or more characteristics of the clean output, and the one or more characteristics of the waste output over a network;
    providing a remote server in electronic communication with the data collection and network communication mechanism;
    receiving the one or more characteristics of the clean output, and the one or more characteristics of the waste output from the data collection and network communication mechanism by the remote server;
    determining a filter media status from the one or more characteristics of the clean output, and the one or more characteristics of the waste output;
    providing a maintenance alert when the one or more characteristics of the clean output, or the one or more characteristics of the waste output reached a predetermined threshold;
    storing historical information regarding the filter media status and the one or more characteristics of the clean output, and the one or more characteristics of the waste output on a non-transitory computer-readable medium of the remote server; and
    predicting a plurality of future filter media statuses for one or more associated future time periods based on an analysis of the historical information of the filter media status and the one or more characteristics of the clean output, and the one or more characteristics of the waste output;
    calculating an optimized pressure by the processing unit of the remote server based on the historical information or, calculating an optimized flow by the processing unit of the remote server based on the historical information;
    generating and providing an anticipated maintenance alert based on one or more trends recognized by the processing unit of the remote server from the historical information;
    regulating an inlet pressure based on the calculated optimized pressure or regulating an inlet flow based on the calculated optimized flow.

* * * * *